United States Patent [19]
Reno

[11] Patent Number: 5,239,414
[45] Date of Patent: Aug. 24, 1993

[54] LASER ASTIGMATISM COMPENSATION
[75] Inventor: Charles W. Reno, Cherry Hill, N.J.
[73] Assignee: General Electric Company, Phila., Pa.
[21] Appl. No.: 707,490
[22] Filed: May 30, 1991
[51] Int. Cl.$^5$ .............................................. G11B 7/14
[52] U.S. Cl. ................................... 359/669; 359/710; 369/112; 369/122
[58] Field of Search ............... 369/122, 111, 112, 121, 369/44.23, 44.24; 346/76 L; 359/638, 710, 669, 204–218; 372/101

[56] References Cited

U.S. PATENT DOCUMENTS

| | | | |
|---|---|---|---|
| 4,410,237 | 10/1983 | Veldkamp | 350/320 |
| 4,520,471 | 5/1985 | Carlin | 369/122 |
| 4,520,472 | 5/1985 | Reno | 369/122 |
| 4,542,492 | 9/1985 | Leterme et al. | 369/122 |
| 4,564,268 | 1/1986 | Tatsuno et al. | 369/122 |
| 4,577,941 | 3/1986 | Kubota | 369/112 |
| 4,626,102 | 12/1986 | Storck | 356/328 |
| 4,643,538 | 2/1987 | Wilson | 350/421 |
| 4,768,184 | 8/1988 | Reno | 369/112 |
| 4,768,184 | 8/1988 | Reno | 369/112 |
| 4,872,747 | 10/1989 | Jalkio et al. | 350/421 |
| 4,948,233 | 8/1990 | Maruyama | 350/421 |

FOREIGN PATENT DOCUMENTS 0310711  4/1989  European Pat. Off. .

Primary Examiner—Paul M. Dzierzynski
Assistant Examiner—Kiet T. Nguyen
Attorney, Agent, or Firm—Geoffrey H. Krauss

[57] ABSTRACT

In an optical system including a laser diode with astigmatism such that the apparent source position in two orthogonal axes each normal to the beam direction differ, a beam prism expander and a collimating lens positioned between the diode and expander, the collimated lens is positioned relative to the laser such that the radius of curvature of the light beam exiting the beam expander in the two axes is identical.

14 Claims, 2 Drawing Sheets

PRIOR ART
FIG. 1
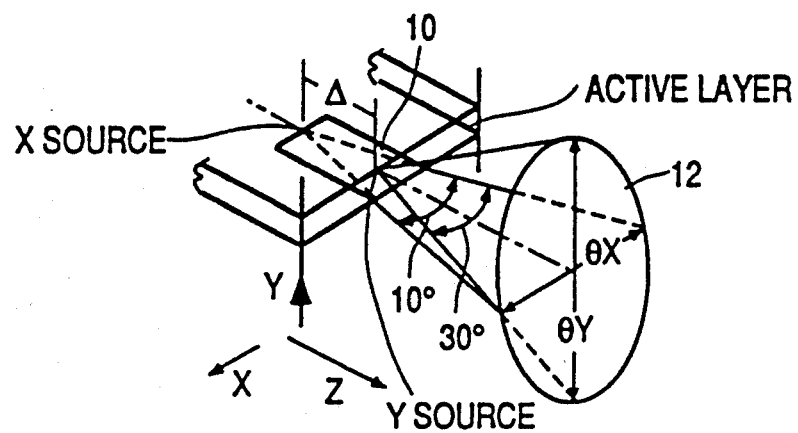
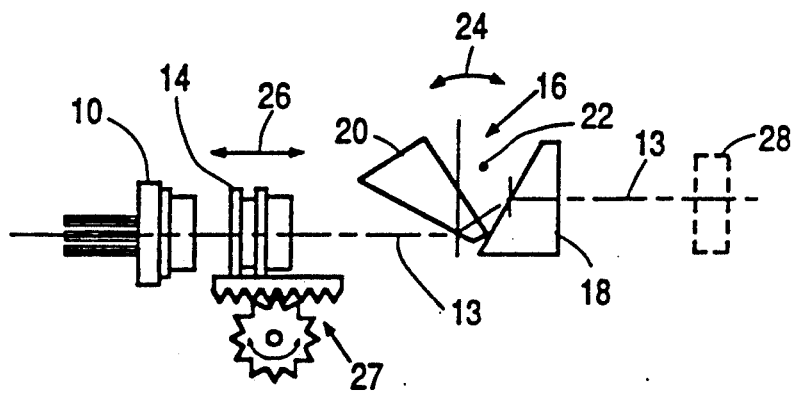
FIG. 2

LASER ASTIGMATISM COMPENSATION

BACKGROUND OF THE INVENTION

1. Field of Invention

This invention relates to an optical system employing an illumination source with astigmatism, a collector lens and a beam expander, and more particularly to compensating for the astigmatism without adding optical components.

2. Description of the Prior Art

Optical record/playback systems are known. They include an illumination source, such as a laser diode, a collector lens to collimate the light from the illumination source, and an anamorphic beam expander to compensate for ovality in the output of the illumination source. The light beam output from the beam expander may then be directed toward the information surface of a suitable information bearing medium for playing (reading) or recording (writing) purposes, as described in U.S. Pat. No. 4,768,184, issued to the instant inventor and assigned to the same assignee, which is incorporated by reference herein.

Unfortunately, the output of a typical laser diode is not only not circular in cross-section but the apparent source points of the light are different as measured in two orthogonal planes in which lie two orthogonal axes, respectively, each orthogonal to the output direction. If the output direction from the laser diode is along the Z axis, the two orthogonal axes are typically termed the X axis and Y axis and the X-Z plane intercepts the X and Z axes while the Y-Z plane intercepts the Y and Z axes. The collector lens is typically positioned at its focal point distance from the source of the light to be collimated. Unfortunately, since there are two apparent source points at the two orthogonal planes and apparent source points at all points in between those planes, the question becomes where to put the collector. A common solution is to place the collector such that its focal point is coincident with one source point, say that along the X axis or Y axis of the laser diode and accept the resulting astigmatism. Another prior art solution is to add additional one or more cylinder lenses beyond the beam expander prisms but that adds additional cost, weight, and complexity.

SUMMARY OF THE INVENTION

In an optical system comprising a source producing a light beam along a central axis which has astigmatism and ovality of intensity as measured normal to the central axis, a prism beam expander positioned to receive the light beam and adjustable to remove the ovality and a collector lens positioned between the light source and the prism beam expander, the improvement comprising positioning the collector lens a distance from the source which causes the beam as it exits the prism beam expander to be substantially identical in radius in planes passing through the central axis and normal to one another.

BRIEF DESCRIPTION OF THE DRAWING

FIG. 1 illustrates, in perspective and mechanically schematically, a typical laser diode with its light emitting pattern which is astigmatic and ovaloid;

FIG. 2 illustrates a top view of this same diode in mechanical form with compensating optics including a collector lens and a prism beam expander;

DETAILED DESCRIPTION OF A PREFERRED EMBODIMENT

Figure 3:
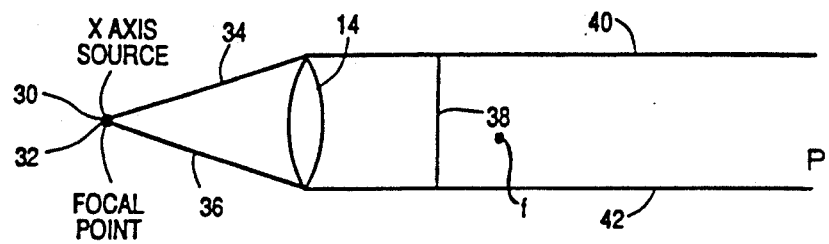
FIG. 3 illustrates an optical pattern corresponding to a top view in FIG. 1 with the collector lens of FIG. 2 positioned such that its focal point is at the source position of the diode in one plane of the laser diode.

Referring to FIG. 1, there is illustrated mechanically schematically a coherent illumination source such as a laser diode 10 which emits an illumination beam along the Z axis. Ideally, it should emit from a single apparent source point and have contour lines of equal intensity with circular shape at any cross-section to the Z axis.

Unfortunately, a typical laser diode 10 emits a beam with contour lines of equal intensity having an oval-shape of about 30 degrees in the Y-Z plane (not shown but intersecting the Y and Z axes) and 10 degrees in the X-Z plane (also not shown but intersecting the X and Z axes) as indicated by oval 12 which indicates points of uniform light intensity in an exemplary plane (not shown) perpendicular to axis Z. Further, the apparent laser source position in the X-Z plane is not coincident with the apparent source position in the Y-Z plane. As illustrated in FIG. 1, the apparent X source is distance $\Delta$ behind (to the left of as illustrated in FIG. 1) the apparent Y source.

The optical system of FIG. 2 is commonly used to compensate for ovality in the laser diode. It includes, in addition to the laser diode 10, a collection objective (collector) lens 14 and an anamorphic prism beam expander 16 comprising prisms 18 and 20 rotatable as a pair around axis 22 as indicated by double-ended arrow 24. The means for rotating prism beam expander 16 is not illustrated in FIG. 2 but is illustrated in the aforementioned U.S. Pat. No. 4,768,184. In accordance with the invention, lens 14 is movable linearly along beam central axis 13 in the directions of double-ended arrow 26 by conventional means illustrated schematically as rack and pinion assembly 27. Optionally, a spherical lens 28 is positioned beyond prism beam expander 16 centered along axis 13.

Conventionally, and for a moment ignoring that the laser diode does not have one source position, lens 14 is positioned such that its focal point is coincident with the source location of diode 10. Thus, the light beam exiting collector lens 14 is collimated but still oval. The beam then passes through prism beam expander 16 which is adjusted to remove the ovality as described in the aforementioned U.S. patent.

The problem associated with a laser diode that does not have its source points coincident at all planes passing through the Z axis will be explained in connection with FIGS. 3, 4, and 5. Assume first in connection with FIG. 1 that a first plane is erected such as to pass through the X and Z axes, and further collector lens 14 FIG. 2 is positioned with its focal point at the X source position of the laser diode.

This arrangement is illustrated optically schematically in FIG. 3 to which attention is directed. In FIG. 3, lens 14 is illustrated as a simple lens having its source focal point indicated by dot 30 coincident with the laser diode X axis source point illustrated by dot 32. As a result, the light beam defined by lines 34 and 36 diverge until it reaches lens 14 by which it is collimated producing a plane wave output as indicated by line 38 and defined by parallel beam lines 40 and 42. With an exemplary lens 14 of 10 millimeters (mm) effective focal length and an emitting pattern of 10 degrees, the full width half maximum (FWHM) output of lens 14 is 1.73 mm.

Figure 4:
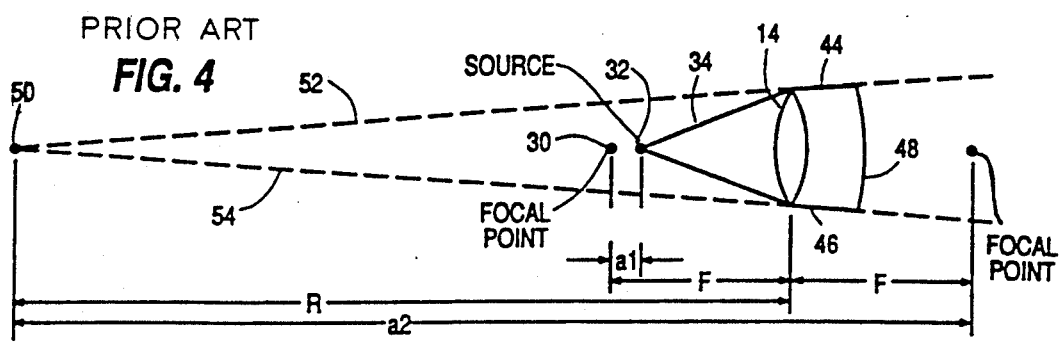
FIG. 4 illustrates an optical pattern corresponding to a side view in FIG. 1 with the collector lens of FIG. 2 positioned such that a source position of the laser in one plane of the laser illustrated in FIG. 3 is between the focal point of the lens and the lens.

FIG. 4 illustrates the same arrangement except that the view is of a plane passing through the Y and Z axes of FIG. 1 and, therefore, the apparent diode source location represented by dot 32 is to the right of the source focal point represented by dot 30 of lens 14. As a result, the beam defined by lines 34 and 36 diverge beyond lens 14 as indicated by solid line portions 44 and 46. With the assumed 10 mm effective focal length of lens 14 and 30 degree emission pattern, the FWHM is 5.19 mm. The resulting wave is not a plane wave as illustrated in FIG. 3 at 38, but rather the wave is curved as illustrated by line 48. The radius of curvature is determined by the image point of source 32 which is, in fact, to the left of lens 14 at point 50 where beam lines 52 and 54, indicated as dashed lines, converge to a point. Lines 52 and 54 are really extensions of lines 44 and 46, respectively. The location of point 50 relative to lens 14 is determined by the Newtonian form of the lens equation which is:

$$a1*a2 = F^2 \qquad (1)$$

where:
* is the multiplier symbol;
F is the focal length of the lens;
a1 is the distance from the laser diode source (X source or Y source) to the source focal point of the lens; and
a2 is the distance from the image focal point of the lens to the image point.

In FIG. 3 distance a1=0 and therefore distance a2=∞ (infinity). In FIG. 4 distances a1, a2 and F (both source and image) are shown. Using equation 1:

$$a2 = \frac{F^2}{a1} = \frac{10^2 \text{ mm}}{50 \text{ μm}} = 2000 \text{ mm} = 2 \text{ m} \qquad (2)$$

Thus, the radius of curvature of wave 44 is about 2 m (meters) for the exemplary system. The wave front exiting from the lens will have a radius of curvature R equal to the distance of the focussed spot from the lens. Thus, R=a2+F but because the image point 50 is to the left not to the right of lens 14, R=|−2000 mm+10 mm|.

Figure 5:
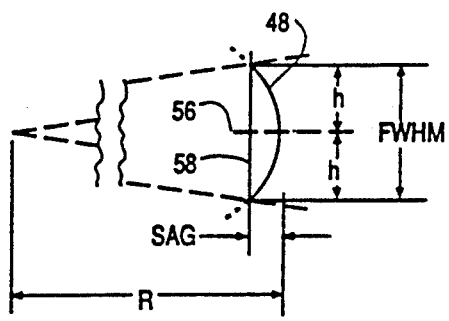
FIG. 5 illustrates the concept of sag.

The concept of sag is introduced in FIG. 5 to which attention is now directed. Sag is defined as the difference between the wave front 48 at its center, indicated by line 56, and a line 58 intersecting wave 48 at its FWHM points. The curvature of wave front 48 is greatly exaggerated in FIG. 5. The formula for sag is:

$$sag = R - \sqrt{R^2 - h^2} \qquad (3)$$

where:
R is the radius of the curvature of wave front 48; and
h is half of the full wave half maximum value.
The first term and by far the most significant term for sag is:

$$sag = \frac{h^2}{2R} \qquad (4)$$

Thus, for the exemplary numbers given above:

$$sag = \frac{(5.19/2)^2}{2 \times 2 \times 10^3} = 0.00168 \text{ mm or } 1.68 \text{ μm} \qquad (5)$$

This represents a difference in the flatness of the optical wave, which has an uncurved form in the Y-Z plane of two times the wavelength of the light assuming an exemplary laser diode wavelength of 0.83 μm. This will produce an aberrated wave that is almost ten times as bad as the limit for a classic diffraction limited spot.

The inventor has discovered that by proper placement of collector lens 14 relative to laser diode 10 the apparent laser diode source positions in the X-Z and Y-Z planes of laser diode 10 may be made the same. Thus, the radius of curvature of the wave exiting the prism expander is identical in the X-Z and Y-Z planes. This will be understood in connection with the following discussion.

Figure 6:
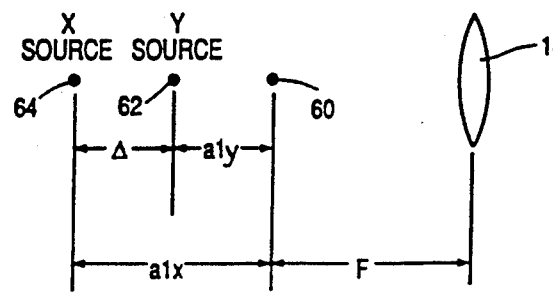
FIG. 6 illustrates some mathematical relationships useful in understanding the invention.

Computation of the precise location of lens 14 with regard to laser diode 10 such as to have both X and Y apparent source locations coincident at the output of the prism beam expander 16 will be understood in connection with FIG. 6 which shows several dimensions to be described in the mathematical treatment which follows. Thus, point 60 marks the source focal point of lens 14 which is distance F from the lens. Point 62 is the apparent Y axis source location of laser diode 10 (FIG. 1) and point 64 is the apparent X axis source location of laser diode 10. Therefore, the distance between points 60 and 62 is designated as a1Y and the distance between focal point 60 and X source location 64 is designated a1X. The relationship between a1 and a2 in terms of the Newtonian form of the lens equation is as set forth in equation 1, a1*a2=F² and the radius of curvature, in general, is of the wave exiting from lens 14 or:

$$R = |a2 + F| \qquad (6)$$

it being remembered that a2 is negative, as illustrated in FIG. 4. Below, we will be dealing with the radius in terms of the wave exiting prism beam expander 16, but since the prism pair is located within 20 mm of lens 14, for all practical purposes the radius of curvature at the output of the prism pair is the same as the radius of curvature at the output of lens 14 in the Y-Z plane. In the X-Z plane it is R÷M² where M is the magnification factor in prism pair 26. Therefore, from FIG. 6:

$$a1X = a1Y + \Delta \qquad (7)$$

Thus, using the Newtonian form of the lens equation (equation 1) as applied specifically to the X and Y axes:

$$a1X*a2X = F^2 \qquad (8)$$

and $$a1Y*a2Y = F^2 \qquad (9)$$

Thus combining equations 8 and 9:

$$a2X = \frac{F^2}{a1X} \qquad (10)$$

and;

$$a2Y = \frac{F^2}{a1Y} \quad (11)$$

Then applying the generalized radius of curvature equation (equation 6) to the X and Y axes:

$$RX = a2X + F \quad (12)$$

$$RY = a2Y + F \quad (13)$$

Substituting in equation 12 for a2X equation 10:

$$RX = \left(\frac{F^2}{a1X} + F\right) * m^2 \quad (14)$$

(after magnification in prism beam expander 16 where m is the magnification factor of the prism pair) and substituting for a2Y in equation 13 the a2Y of equation 11:

$$RY = \left(\frac{F^2}{a1Y} + F\right) \quad (15)$$

with no magnification in prism beam expander 16.

The calculation for dimensions a1Y and a1X may next be computed with the following assumption, that being that RY is much, much greater than F and RX is much, much greater than F, and with the understanding that the goal is to have the value RY equal to the value RX, that is, the radius of curvature in the Y axis is equal to the radius of curvature in the X axis. Thus equating equations 14 and 15:

$$RX = RY = \frac{F^2 * m^2}{a1X} = \frac{F^2}{a1Y} \quad (16)$$

The F terms are missing because, as stated previously, it is assumed that RY and RX are each much, much greater than F. Eliminating F from the above equation results in:

$$a1X = a1Y * m^2 \quad (17)$$

Substituting equation 7 in equation 17 produces:

$$a1X = (a1X - \Delta) * m^2 \quad (18)$$

Rearranging terms and solving for a1X produces:

$$a1X = \frac{\Delta * m^2}{m^2 - 1} \quad (19)$$

Thus, for a magnification factor m=3 and $\Delta = 50$ μm:

$$a1X = \frac{50 * 9}{9 - 1} = 56.25 \text{ μm} \quad (20)$$

and therefore utilizing equation 7:

$$a1Y = 6.25 \text{ μm} \quad (21)$$

Thus, for proper operation the lens is placed such that its focal point is to the right of both of the X and Y source points of laser diode 10, not such that its focal point is at one of those source points or in between the source points as one might conclude absent the teachings of the instant invention.

Of course, with the lens positioned as described a small amount of spherical power at the output of the prism beam expander 16 occurs, which, if correction is necessary, can be corrected by positioning a spherical lens 28, FIG. 2, at the output of the beam expander. If this proves necessary, it will be understood that spherical lenses are much easier to construct and, therefore, less expensive than are cylindrical lenses used in the prior art for the correction of astigmatism in laser diode 10. Further, laser diode 10 may, in fact, be a laser diode array as illustrated and described in the aforementioned U.S. Pat. No. 4,768,184 each element of the array having different apparent source positions in its X-Z and Y-Z planes.

What is claimed is:

1. A method for reducing astigmatism in an optical system comprising: (1) a source for producing a light beam along a central axis, which the beam has contour lines of equal intensity having an oval shape as measured normal to the central axis and has astigmatism due to a difference in position of the apparent source points on the emission surface of the source, (2) a prism beam expander positioned along the central axis to receive a light beam and adjustable to change the shape of the contour lines to circular, and (3) a collector lens positioned between the light source and the prism beam expander and having a focal point, the improvement step comprising adjusting the position of the collector lens to place the focal point thereof between the lens and the nearest of the apparent source points with respect to the lens and substantially at a distance from the source which removes the astigmatis of the beam.

2. The method as set forth in claim 1 wherein said source producing said light beam is a laser diode.

3. The method as set forth in claim 1 wherein said prism beam expander comprises first and second prisms arranged serially along said central axis.

4. The method as set forth in claim 2 wherein said laser diode is a laser diode array.

5. The method as set forth in claim 4 wherein said prism beam expander comprises first and second prisms arranged serially along said central axis.

6. The method set forth in claim 1 wherein the lens is a bi-convex lens.

7. The method set forth in claim 6 wherein the lens has an effective focal length on the order of 10 mm.

8. A method for reducing astigmatism in an optical system comprising: (1) a source for producing a light beam along a central axis, which the beam has astigmatism wherein the first and second apparent source points differ by distance $\Delta$ as measured along axes normal to one another and normal to the central axis and which the beam has contour lines of equal intensity having an oval shape as measured normal to the central axis, (2) an anamorphic prism beam expander, having a magnification factor M, positioned along the central axis to receive the light beam and adjustable to change the shape of the contour lines to circular, and (3) a collector lens positioned between the light source and the prism beam expander, the lens having a focal point, the improvement step comprising adjusting the position of the collector lens along the central axis to place its focal point between the lens and the nearest of the apparent source points, at a distance A1X from the first apparent source point and at a distance A1Y from the second apparent source point, where $A1X = A1Y*M^2$ and $A1X = A1Y + \Delta$.

9. The method as set forth in claim 8 wherein said source producing said light beam is a laser diode.

10. The method as set forth in claim 9 wherein said laser diode is a laser diode array.

11. The method as set forth in claim 10 wherein said prism beam expander comprises first and second prisms arranged serially along said central axis.

12. The method as set forth in claim 8 wherein said prism beam expander comprises first and second prisms arranged serially along said central axis.

13. The method set forth in claim 8 wherein the lens is a bi-convex lens.

14. The method set forth in claim 13 wherein the lens has an effective focal length on the order of 10 mm.

* * * * *